United States Patent
Kishimoto et al.

Patent Number: 5,516,983
Date of Patent: May 14, 1996

[54] POLYMER ELECTRIC DEVICE

[75] Inventors: Yoshio Kishimoto; Masa-aki Suzuki, both of Hirakata, Japan

[73] Assignee: Matsushita Electric Industrial Co. Ltd., Osaka, Japan

[21] Appl. No.: 220,046

[22] Filed: Mar. 30, 1994

[30] Foreign Application Priority Data

Mar. 31, 1993 [JP] Japan ................................. 5-074606

[51] Int. Cl.$^6$ .................................................. H01B 3/18
[52] U.S. Cl. ................................ 174/1; 525/10; 525/479
[58] Field of Search ........................... 174/1; 525/479, 525/10

[56] References Cited

U.S. PATENT DOCUMENTS

| | | | |
|---|---|---|---|
| 4,049,859 | 9/1977 | Yoshikawa et al. | 428/172 |
| 4,632,856 | 12/1986 | Marcus et al. | 428/172 |
| 4,643,910 | 2/1987 | Foutz | 427/10 |
| 4,652,605 | 3/1987 | Chang et al. | 525/10 |
| 4,990,400 | 2/1991 | Endo et al. | 428/331 |
| 5,002,652 | 3/1991 | Nelson et al. | 204/412 |
| 5,103,371 | 4/1992 | Ogawa et al. | 361/323 |
| 5,120,406 | 6/1992 | Shono et al. | 204/59 QM |
| 5,127,964 | 7/1992 | Hamakawa et al. | 136/256 |
| 5,134,175 | 7/1992 | Lucey | 522/76 |
| 5,358,987 | 10/1994 | Kanai et al. | 524/254 |

*Primary Examiner*—Kristine L. Kincaid
*Assistant Examiner*—Paramita Ghosh
*Attorney, Agent, or Firm*—Fish & Richardson

[57] ABSTRACT

A polymer electric device including a conductor and an electrically insulating polymer layer in contact with the conductor, wherein the electrically insulating polymer layer is a self-recovering and electrically insulating polymer layer which chemically reacts under the electric field of the conductor and recovers the electrically insulating properties of the polymer layer in the vicinity of the conductor which deteriorate with time.

11 Claims, 4 Drawing Sheets

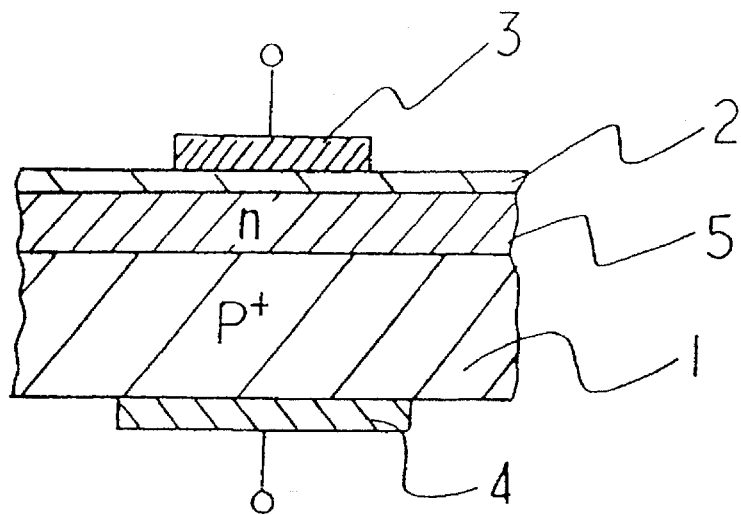
Fig. 4 (1)
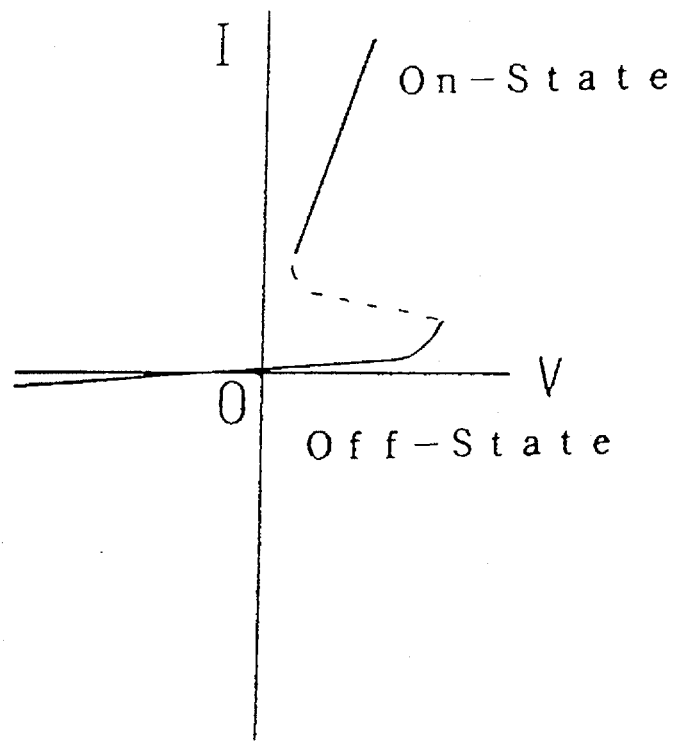
Fig. 4 (2)

POLYMER ELECTRIC DEVICE

FIELD OF THE INVENTION

This invention relates to a polymer electric device for ultrathinfilm devices, thinfilm tunnel devices, high-voltage components or the like. Specifically, the invention relates to a polymer electric device capable of preventing the insulating properties of the device from deterioration over time.

BACKGROUND OF THE INVENTION

Most conventional polymer materials consist of polymers having a main chain formed of C—C covalent bonds. These materials are superior in mechanical properties such as processability, moldability or flexibility. Further, the materials are so electrically insulating that they are used as an insulating material for many electrically components.

Polymers having a main chain of siloxane bonds instead of C—C covalent bonds, called silicone resin, are also in use as electrically insulating materials.

Aluminum oxide dielectric films for aluminum electrolytic capacitors or the like are self-recovering. Specifically, an aluminum film on the surface of aluminum electrodes is passive, and the film forms a dense oxide film. A pin hole or defect on the aluminum oxide dielectric films is anodized by the electric field in the electrolytic solution. The aluminum oxide dielectric film is thus recovered.

However, no insulating polymers capable of recovering insulation on their own were found. Polymers in wide use as insulating materials usually consist of polymers having a main chain of C—C covalent bonds. Such polymers, however, had many problems. For example, the degree of polymerization decreases due to decomposition of the polymer by high electric-field or high temperatures. In the contrary case, double bonds (C=C) are often formed so that the polymer is gradually carbonized. A conductive tree phenomenon or a tracking phenomenon then takes place, finally causing dielectric breakdown. The arc generating from a void or crack carbonizes the polymer, similarly causing dielectric breakdown. The smaller the device, the more serious was the problem of deteriorating the insulating properties. For that reason, polymer materials which exhibit a high breakdown voltage and a high durability in microelements have been desired.

SUMMARY OF THE INVENTION

The object of the invention is to provide a polymer electric device using a self-recovering and electrically insulating polymer layer, which prevents deterioration.

A first polymer electric device of the invention comprises a conductor and an electrically insulating polymer layer in contact with the conductor, and the electrically insulating polymer layer is a self-recovering and electrically insulating polymer layer, which chemically reacts under the electric field of the conductor and at the same time recovers the electrically insulating properties of the polymer layer near the conductor which deteriorate with time. Hereinafter, the term "self-recovering and electrically insulating" is used as one word.

Preferred modes of the self-recovering and electrically insulating polymer layer include the following three embodiments (1) to (3).

(1) The self-recovering and electrically insulating polymer layer comprises a polymer having a main chain of Si—Si covalent bonds, and the polymer contacts an anodic conductor and oxidizes to form siloxane bonds. It is preferable that the polymer having a main chain of Si—Si covalent bonds comprises at least one polymer selected from the group consisting of polysilane and copolymers thereof.

(2) The self-recovering and electrically insulating polymer layer comprises an electrically insulating polymer containing an ionic polymerization catalyst and having a main chain of C—C covalent bonds, and the catalyst migrates toward the electric field of the conductor and promotes polymerization near the conductor to recover the molecular weight of the electrically insulating polymer which decreases with time. It is preferable that the content of the catalyst is 0.01 to 1.00 wt %. It is also preferable that the electrically insulating polymer layer, which was polymerized by an ionic polymerization catalyst, comprises at least one polymer selected from the group consisting of polyamide, polyester and polyimide, all of which are condensation-polymerized by an acidic catalyst.

(3) The self-recovering and electrically insulating polymer layer comprises an electrically insulating polymer containing an electrolytically polymerizable precursor and having a main chain of C—C covalent bonds, and the precursor polymerizes near the conductor and restores defects in the electrically insulating polymer layer. It is preferable that the content of the precursor is 0.01 to 3.00 wt %. It is also preferable that the precursor comprises a low grade polymer having an average molecular weight of 500 to 2000.

The electrically insulating polymer containing an electrolytically polymerizable precursor and having a main chain of C—C covalent bonds can have a side chain of an electrolytically polymerizable functional group. In this case, the functional group serves like the precursor. Consequently, the functional group polymerizes near the conductor and restores defects in the electrically insulating polymer layer.

It is also preferable in modes (1) through (3) that the polymer electric device is at least one device selected from the group consisting of ultrathinfilm devices, thinfilm tunnel devices and high-voltage components. It is further preferable that the ultrathinfilm device is a thinfilm capacitor comprising a dielectric thin film of the self-recovering and electrically insulating polymer layer. It is also preferable that the thinfilm tunnel device is at least one device selected from the group consisting of Metal-Insulator-Semiconductor (hereinafter abbreviated as MIS)-type solar cells, MIS-type light emitting devices and MIS-type switching devices. It is further preferable that the high-voltage component is a high-voltage capacitor or high-voltage transformer comprising a dielectric layer of the self-recovering and electrically insulating polymer layer.

BRIEF DESCRIPTION OF THE DRAWINGS

FIG. 4 (1) is a sectional view of a switching device of another embodiment of the invention. FIG. 4 (2) shows the voltage/current characteristic curve of the switching device of the embodiment.

DETAILED DESCRIPTION OF THE INVENTION

Figure 1:
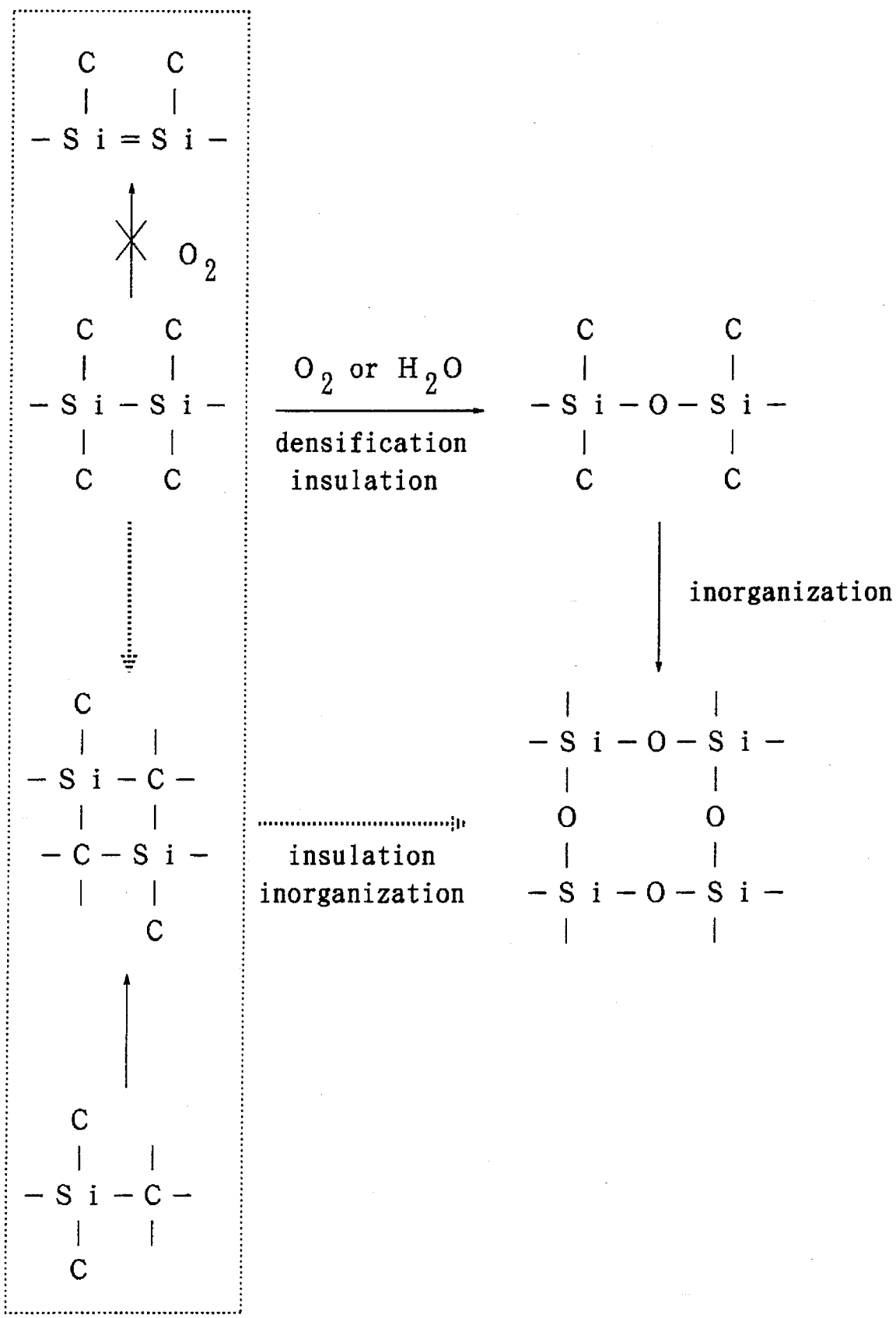
FIG. 1 is a scheme showing a chemical reaction of a polymer having an Si—Si covalent bond of an embodiment of the invention.

A polymer having a main chain of Si—Si covalent bonds of the above embodiment (1) is generally called a polysilane. FIG. 1 above shows that an Si=Si double bond does not develop in such a polymer in the presence of oxygen, and the polymer is oxidized in the presence of oxygen or water to form a siloxane bond where an oxygen atom is present between an Si—Si bond. The formation of siloxane bonds increases the density of the polymer with the insulating properties, and the polymer is similar to a dense silicone resin. In other words, the polymer electric device contacts an anodic conductor and oxidizes, and the polymer layer of the device is then densified and well insulated. The polymer layer thus recovers itself, and it is free from voids, a sign of dielectric breakdown. The result is an insulating film having a long lifetime. FIG. 1 also shows that the polymer layer is exposed to extremely high temperatures for a long time to form silicon dioxide. However, this reaction hardly occurs under typical conditions.

With the electrically insulating polymer containing an ionic polymerization catalyst and having a main chain of C—C covalent bonds of the above embodiment (2), the catalyst migrates toward the electric field of the conductor. There, the catalyst is condensed, promoting polymerization. The molecular weight of the electrically insulating polymer layer, which decreased with time, is thus recovered.

With the electrically insulating polymer containing an electrolytically polymerizable precursor of the above embodiment (3), the precursor is subjected to an oxidation-reduction reaction near the conductor to polymerize, thus restoring a defect in the electrically insulating polymer layer. There are generally two types of electrolytic polymerization, anodic oxidation polymerization and cathodic reduction polymerization. Which polymerization takes place depends on the nature of the precursors. In anodic oxidation polymerization, electrons are first pulled from a precursor, and consequently electrophilic substitution coupling or radical coupling occurs, which causes polymerization. When polymer films are formed by anodic oxidation polymerization, initiators are usually accumulated near an electrode, and a side reaction is often inevitable. On the contrary, in the electrolytic polymerization of the invention, the polymerization is local enough to restore a defect in the polymer insulating layer. Therefore, the side reaction hardly occurs, and the polymer insulating layer recovers itself.

The electrically insulating polymer containing an electrolytically polymerizable precursor of the invention includes a polymer where an electrolytically polymerizable precursor is bonded to the chain of the polymer. For example, an electrically insulating polymer having a side chain of electrolytically polymerizable functional groups is originally well insulating. Polymerization of the functional groups near the conductor can result in crosslinking between the polymers.

Figure 2:
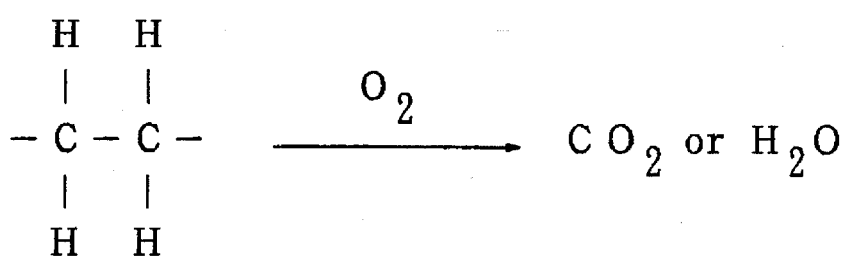
FIG. 2 is a scheme showing a chemical reaction of a polymer having a C—C covalent bond of an embodiment of the invention.
Figure 2:
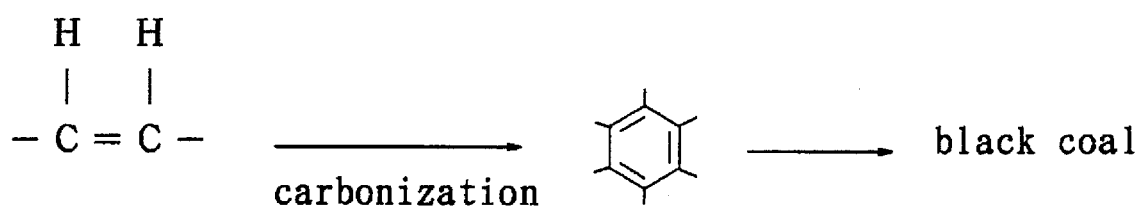

The self-recovering and insulating polymer is densified and well-insulated, and the polymer is free from pin holes, voids or cracks. Furthermore, dielectric breakdown does not occur. Common polymers having a main chain of C—C covalent bonds are decreased in degree of polymerization due to deterioration and depolymerization. Alternately, as shown in FIG. 2, the polymers are decomposed in the presence of oxygen, emitting a gas. On the other hand, a C=C double bond is formed without the presence of oxygen, and the polyacene structure is developed to carbonize until black coal is produced. When these reactions occur under the electric field, it leads to dielectric breakdown such as occurrence of trees or tracking, and finally the polymer electric device breaks. Dielectric breakdown, called water tree, occurs in the presence of water, causing a crack. The above insulating polymer containing an ionic polymerization catalyst or an electrolytically polymerizable precursor recovers itself for preventing such dielectric breakdown and providing a highly durable insulating polymer.

The polymer electric device of the invention having a long lifetime is most useful for thin film capacitors, MIS-type solar cells, MIS-type light emitting devices, MIS-type switching devices, high-voltage capacitors, or high-voltage transformers.

Examples of a polymer having a main chain of Si—Si covalent bonds of the above embodiment (1) called polysilane include polysilylene, or copolymers thereof as well as blended polymers or polymer compositions containing polysilane. Polysilane, often called organosilane, basically has the polysilylene structure having two side chains of carbon atoms. There are a variety of molecular structures in the two side chains, such as alkyl groups, or aryl groups. Polysilane usually exhibits p-type semiconductivity, because conjugated G electrons of delocalized Si—Si bonds in the main chain become charge carriers by anion-doping. However, polysilane loses the semiconductivity after a chemical reaction with oxygen or water. Si—Si covalent bonds of polysilane then decompose to siloxane bonds or silanol. Silanol is so unstable that it forms siloxane bonds. This reaction is similar to self-recovery in the self-recovering and insulating polymer of the invention. When polysilane forms siloxane bonds, the polysilane has a molecular structure having a main chain of siloxane bonds as polydimethylsiloxane does, being as insulating, stable, and heat-resistant as the silicone resin. As explained above, polysilane is suitable for the invention, though it is initially conductive. Addition of a polymerization catalyst to polysilane is also possible to effectively form siloxane bonds.

Examples of the electrically insulating polymer having a main chain of C—C covalent bonds of the above embodiment (2) include a variety of common polymers, such as aliphatic or aromatic polymers.

The ionic polymerization catalyst in the electrically insulating polymer of the above embodiment (2) refers to an acidic or basic catalyst for use in polymerization. For example, phosphoric acid is a catalyst for polymerizing polyamide (nylon). Insulating polymers formed by condensation-polymerization, particularly, using an acidic catalyst is suitable for the self-recovering and insulating polymer layer on an anode of a conductor used in the invention. Polyamide, polyester, or polyimide is a particularly preferred polymer. A preferable content of the ionic polymerization catalyst is 0.01 to 1.00 wt %. Such concentration enables the catalyst to work most effectively without deteriorating the insulation of the polymer.

The electrolytically polymerizable precursor in the self-recovering and electrically insulating polymer having a main chain of C—C covalent bonds of the above embodiment (3) refers to a precursor which is subjected to electrolytic polymerization by a conductor as an anode. Any precursors including monomers, dimers, trimers or oligomers are suitable as precursors as long as they polymerize by an oxidation-reduction reaction, because such precursors can electrolytically polymerize. Specific examples of the precursors include aromatic monomers, such as pyrrole, thiophene, benzene, aniline, phenol, thiophenol, pyridine, bipyridine, or derivatives thereof; vinyl monomers, such as N-vinylcarbazole, vinyl acetate, or styrene, or low grade polymers thereof. Low grade polymers having an average molecular weight of approximately 500 to 2000 are actually more suitable than monomers, since those polymers are less volatile and sufficiently fluid in a polymer matrix. A preferable content of the precursor is 0.01 to 3.00 wt %. Such a concentration enables the precursor to polymerize effectively without deteriorating the insulation of the polymer.

The electrolytically polymerizable precursors polymerize to form polypyrrole, polythiophene, polyphenylene, polyaniline, polyphenylene oxide, polyphenylene sulfide, polypyridine, poly-N-vinylcarbazole, poly(vinyl acetate), polystyrene, or copolymers thereof. Many general-purpose polymer materials are available as insulating polymers having a main chain of C—C covalent bonds for a polymer matrix. Though the polymer matrix and the precursor can be of the same material, any materials can be combined as long as they have an affinity and compatibility for each other. The addition of a chemical polymerization catalyst to the polymer materials can improve the efficiency of the reaction.

When the insulating polymer containing an electrolytically polymerizable precursor and having a main chain of C—C covalent bonds comprises an insulating polymer having a side chain of an electrolytically polymerizable functional group, the electrolytically polymerizable functional group is preferably a phenyl, thienyl, pyridyl, or anilino group. The side chain, properly modified with such a group, can attain the object of the the embodiment.

Alternately, the introduction of a hydrogen bonding group to the insulating polymer, or addition of an adhering polymer to the polymer can improve adhesion between the polymer and the electric field of the conductor. Among those hydrogen bonding groups, active hydrogen groups, such as an hydroxyl group or an amide group help the self-recovery of the polymer.

Methods of forming a film from the self-recovering and insulating polymers of the invention for the electric device include a variety of methods, such as casting method, spray-coating method, ink jet method, evaporation polymerization, electrolytic polymerization, plasma polymerization, or Langmuir-Blodgett method.

Additives to the self-recovering and insulating polymers of the invention may be included, depending upon the requirements.

The polymer electric devices of the invention are especially suitable for ultrathinfilm devices, thinfilm tunnel devices, or high-voltage components. Those devices, which are likely to suffer dielectric breakdown, are provided with a long lifetime by the polymer electric devices of the invention.

Figure 3:
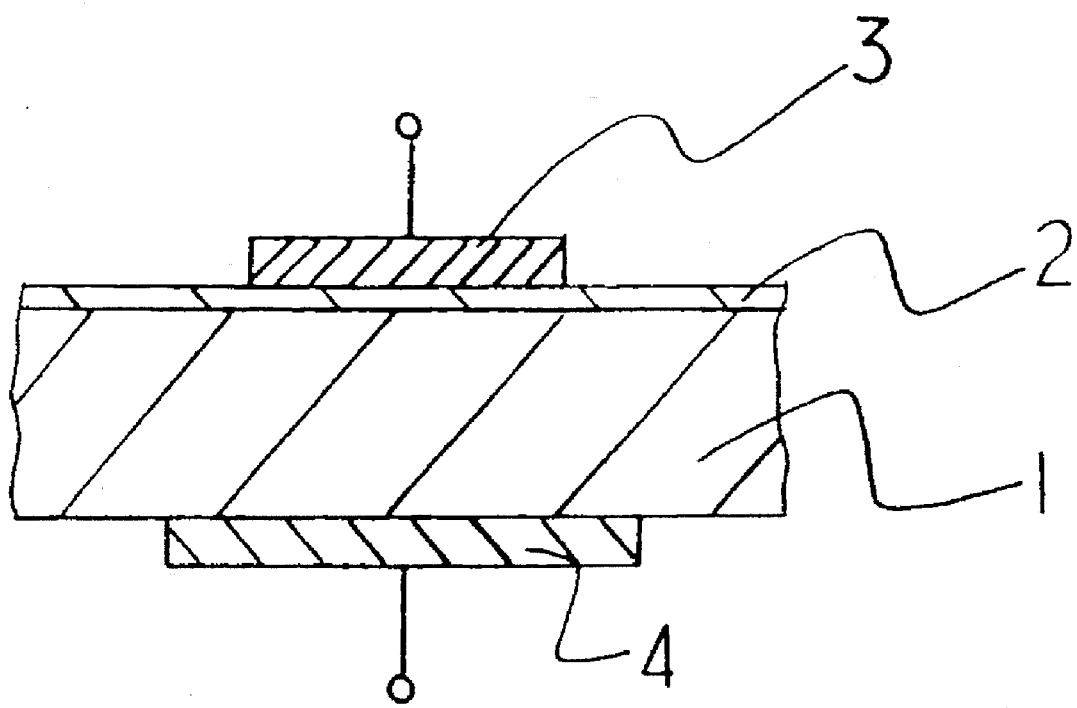
FIG. 3 is a sectional view of a polymer electric device of an embodiment of the invention.

An insulating layer plays an important role in a semiconductor device. The device of the invention improves reliability of an MIS-type polymer electric device using a tunnel insulating layer as shown in FIG. 3.

The self-recovering and insulating polymer is suitable for use as a dielectric thin film in thin devices, providing the device with a high breakdown voltage for a long time. The self-recovering and insulating polymer is also for use as a tunnel thin film in MIS-type solar cells, MIS-type light emitting devices, or MIS-type switching devices, providing the device a long lifetime. The self-recovering and insulating polymer is also suitable for use as a dielectric layer in high-voltage components, providing high-voltage capacitors or high-voltage transformers having a high endurable voltage and a long lifetime.

EXAMPLE 1

On a 6 μm thick polyester film deposited with aluminum, a polydimethylsilylene thin film having a thickness of about 50 μm was formed by a casting method with toluene. The film was then oxidized in the presence of oxygen to form a dense insulating thin film having a main chain of polysiloxane bonds as a dielectric film. Further, an oxygen-permeable aluminum electrode pattern was deposited. After the film was cut and layered, a capacitor having a tip shape and having a 25 nF capacitance was completed. Its leakage current was 1 pA or less, and its breakdown voltage was 15 V. A load and lifetime test was performed by applying a voltage of 12 V to the capacitor in an atmosphere of 90% RH at 40° C. After 6000 hours the capacitance was found to increase, and the breakdown voltage was shown to be 18 V. A material analysis showed that the dielectric film was originally formed of polydimethylsiloxane containing Si—Si bonds. However, few Si—Si bonds were detected after the test. The capacitor was subjected to an overload test, and dielectric breakdown or ignition did not readily occur.

EXAMPLE 2

A 0.5 μm thick aromatic polyamide film containing 0.5 wt % orthophosphoric acid was used as an insulating polymer film having a main chain of C—C covalent bonds and containing an ionic polymerization catalyst. Aluminum patterned electrodes were formed on both surfaces of the film. After the film was cut and layered, a capacitor having a tip shape and having a 15 nF capacitance was finished. Its leakage current was 1 pA or less, and its breakdown voltage was 250 V. A load and lifetime test was performed by applying a voltage of 200 V to the capacitor in air at 120° C. After 6000 hours the capacitance and the breakdown voltage were found to be almost the same as before. A material analysis revealed that the average molecular weight of the dielectric film after the test was almost the same as the original average molecular weight of the film.

EXAMPLE 3

A 300 nm thick polyimide film was used as an insulating polymer film having a main chain of C—C covalent bonds and containing an electrolytically polymerization catalyst. The polyimide film was thermally condensation-polymerized and impregnated with 1 wt % polyamide with a low degree of polymerization. On both surfaces of the polyimide film aluminum patterned electrodes were formed. After the film was cut and layered, a capacitor having a tip shape and having a 12 nF capacitance was finished. Its leakage current was 1 pA or less, and its breakdown voltage was 100 V. A load and lifetime test was performed by applying a voltage of 80 V to the capacitor in air at 150° C. After 6000 hours the capacitance and the breakdown voltage were found to be almost the same as before. A material analysis revealed that the average molecular weight of the dielectric film after the test was increased by 10% or more, compared to the original average molecular weight of the film.

EXAMPLE 4

FIG. 3 shows a Schottky barrier-type MIS solar cell made up of a p-type CdTe semiconductor layer 1, a 2 nm thick tunnel insulating thin film 2, and gold electrodes 3 and 4. The film 2 had been formed in the same manner as the dielectric film in EXAMPLE 1. The gold electrodes 3 and 4 were formed by evaporation. A lifetime test showed that dielectric breakdown did not occur to the solar cell, and the cell exhibited a high conversion efficiency of 14% and good performance for a relatively long time.

EXAMPLE 5

A 9 nm thick tunnel insulating thin film was formed on a p-type GaP semiconductor layer. The film had been formed in the same manner as the dielectric film in EXAMPLE 1. After a gold electrode 3 was deposited on the film, a Schottky barrier-type MIS solar cell was finished. The solar cell was a green-light emitting device. A lifetime test showed that dielectric breakdown did not occur to the solar cell and the cell exhibited a high conversion efficiency of 9% and good luminous properties for a relatively long time.

EXAMPLE 6

FIG. 4 (1) shows a Schottky barrier-type HIS switching diode made up of a p-type GaAs semiconductor layer 1, an n-type epitaxially-grown layer 5, a 3 nm thick tunnel insulating thin film 2, and gold electrodes 3 and 4. The film 2 had been formed in the same manner as the dielectric film in EXAMPLE 1. The gold electrodes 3 and 4 were formed by evaporation. FIG. 4 (2) shows that the switching diode exhibited good negative resistance switching properties for properly controlling currents. A lifetime test showed that dielectric breakdown did not occur to the diode and the diode maintained good switching properties for a relatively long time.

EXAMPLE 7

A 10 μm thick polyphenylsilylene film was used as a polymer film having a main chain of Si—Si covalent bonds. An aluminum patterned electrode was formed on only one surface of the film. After the film was wound up together with a 10 μm thick aluminum film, they were subjected to a heat treatment to fuse. A high-voltage capacitor having a 15 nF capacitance was thus completed. Its leakage current was 1 pA or less, and its breakdown voltage was 1.5 kV. A load and lifetime test was performed by applying a voltage of 1.2 kV to the capacitor in air at 100° C. After 6000 hours the capacitance and the breakdown voltage were found to be almost the same as before. A material analysis showed that the dielectric film was originally formed of polymethylphenylsilylene containing Si—Si bonds. However, few Si—Si bonds and many siloxane bonds were detected after the test. A crack or tree, as a sign of dielectric breakdown or ignition, did not readily occur in the capacitor.

EXAMPLE 8

A 20 μm thick polyimide film was used as a coating for coil wire. The polyimide film was thermally condensation-polymerized and impregnated with 1 wt % polyamide acid of a low degree of polymerization. The coating was equivalent to an insulating polymer having a main chain of C—C covalent bonds and containing an electrolytically polymerizable precursor. The coil wire was wound around a soft magnetic core to finish a high-voltage transformer. Its alternating breakdown voltage was about 15 kV. A load and lifetime test was performed by applying a voltage of 12 kV to the transformer in air at 150° C. After 6000 hours the breakdown voltage and the leakage current were found to be almost the same as before. A material analysis showed that the average molecular weight of the coating after the test was almost the same as the original average molecular weight of the coating.

As explained above, the polymer electric device of the invention is suitable for ultrathinfilm devices, thinfilm tunnel devices, high-voltage components, specifically thin capacitors, MIS-type solar cells, MIS-type light emitting devices, MIS-type switching devices, high-voltage capacitors or high-voltage transformers.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A polymer electric device comprising a conductor and an electrically insulating polymer layer in contact with said conductor, wherein said electrically insulating polymer layer is a self-recovering polymer layer and said electrically insulating polymer layer chemically reacts under the electric field of said conductor and recovers the electrically insulating property of said polymer layer which deteriorates with time;

wherein the electrically insulating polymer layer comprises a polymer having a main chain of an Si—Si covalent bond, and wherein said polymer contacts the conductor which is a conductor of an anode and oxidizes to form a siloxane bond.

2. The polymer electric device according to claim 1, wherein the polymer having a main chain of an Si—Si covalent bond comprises at least one polymer selected from the group consisting of polysilane and a copolymer of polysilane.

3. A polymer electric device comprising a conductor and electrically insulating polymer layer in contact with said conductor, wherein said electrically insulating polymer layer is a self-recovering polymer and said electrically insulating polymer layer chemically reacts under the electric field of said conductor and recovers electrically insulating property of said electrically insulating polymer layer which deteriorates with time;

wherein the electrically insulating polymer layer comprises an ionic polymerization catalyst and has a main chain having a C—C covalent bond, and wherein said ionic polymerization catalysts migrates towards the electric field of the conductor and promotes polymerization in the vicinity of the conductor to recover the molecular weight of a polymer forming said electrically insulating polymer which decreases with time.

4. The polymer electric device according to claim 3, wherein the content of the ionic polymerization catalyst is 0.01 to 1.00 wt %.

5. The polymer electric device according to claim 3, wherein the electrically insulating polymer layer comprises at least one polymer selected from the group consisting of polyamide, polyester and polyimide.

6. A polymer electric device comprising a conductor and an electrically insulating polymer layer in contact with said conductor, wherein said electrically insulating polymer layer is a self-recovering polymer layer and said electrically insulating polymer layer chemically reacts under the electric field of said conductor and recovers the electrically insulating property of said polymer layer which deteriorates with time;

wherein the electrically insulating polymer layer comprises an electrically insulating polymer containing an electrolytically polymerizable precursor and has a main chain having a C—C covalent bond, and wherein said electrolytically polymerizable precursor polymerizes in the vicinity of the conductor and restores defects in said electrically insulating polymer layer.

7. The polymer electric device according to claim 6, wherein the content of the electrolytically polymerizable precursor is 0.01 to 3.00 wt %.

8. The polymer electric device according to claim 6, wherein the electrolytically polymerizable precursor comprises a low grade polymer having an average molecular weight of 500 to 2000 g/mole.

9. A polymer electric device comprising a conductor and an electrically insulating polymer layer in contact with said conductor, wherein said electrically insulating polymer layer is a self-recovering polymer layer and said electrically insulating polymer layer chemically reacts under the electric field of said conductor and recovers the electrically insulating property of said polymer layer which deteriorates with time;

wherein the electrically insulating polymer layer comprises a polymer having a main chain of an Si—Si covalent bond, and wherein said polymer contacts the conductor which is a conductor of an anode and oxidizes to form a siloxane bond;

wherein the polymer electric device is at least one device selected from the group consisting of an ultrathinfilm device, a thinfilm tunnel device and a high-voltage component; where the thinfilm tunnel device is at least one device selected from the group consisting of an MIS-type solar cell, an MIS-type light emitting device and an MIS-type switching device.

10. The polymer electric device according to claim 9, wherein the polymer electric device is an ultrathinfilm device which is a film capacitor comprising a dielectric ultrathinfilm of the self-recovering and electrically insulating polymer layer.

11. The polymer electric device according to claim 9, wherein the high-voltage component is one of a high-voltage capacitor and a high-voltage transformer comprising a dielectric layer of the self-recovering and electrically insulating polymer layer.

* * * * *